US007066615B2

(12) United States Patent
Diggle, III et al.

(10) Patent No.: US 7,066,615 B2
(45) Date of Patent: Jun. 27, 2006

(54) LIGHT RETAINER

(75) Inventors: Frederick James Diggle, III, Birmingham, AL (US); Steven Ryals, Pinson, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/805,844

(22) Filed: Mar. 22, 2004

(65) Prior Publication Data

US 2005/0207144 A1 Sep. 22, 2005

(51) Int. Cl.
*B23B 25/18* (2006.01)

(52) U.S. Cl. ...................................... 362/120; 362/119

(58) Field of Classification Search ................ 362/119, 362/120, 190, 191

See application file for complete search history.

(56) References Cited

U.S. PATENT DOCUMENTS 5,144,546 A * 9/1992 Burdi ......................... 362/191
5,594,254 A * 1/1997 Palmer ................... 250/504 R
5,636,918 A * 6/1997 Lott ........................... 362/139
5,860,728 A * 1/1999 Maglica ...................... 362/191
5,915,825 A * 6/1999 Weister ...................... 362/139
6,116,747 A * 9/2000 Grawemeyer et al. ...... 362/119
6,193,386 B1 * 2/2001 Reynolds .................... 362/109
6,379,020 B1 * 4/2002 Lewis et al. ................ 362/120
6,851,824 B1 * 2/2005 Hsien ......................... 362/119
2002/0105794 A1 * 8/2002 Hanscom et al. ............. 362/31
2002/0105797 A1 * 8/2002 Navid et al. ................ 362/120

OTHER PUBLICATIONS 9-in-1 Micro Lite Screwdriver Light and Magnetic Retriever, catalog webpages, accessed Feb. 24, 2004, MCM, http://www.newark.com . . . .
9-in-1 Micro Magnetic Lite Screwdriver & Telescoping Retriever, catalog webpage, accessed Feb. 24, 2004, http://www.newark.com/product-details/text/mcm/html/22-3295.html.
Vector 3 Million Candlepower Rechargeable Sport Spotlight, catalog webpages, accessed Jun. 21, 2004, Wal-Mart, http://www.walmart.com/catalog . . . .
Flashlight C Angled Lens BS, catalog, date unknown.
Angle Head Flashlight-Black, catalog webpages, accessed Jun. 21, 2004, LoadUp.com, http://west.loadup.com/military/surplus/311.html.
9-in-1 Micro Magnetic Lite Screwdriver & Telescoping Retriever, catalog, date unknown.

* cited by examiner

*Primary Examiner*—Ali Alavi
*Assistant Examiner*—Hargobind S. Sawhney
(74) *Attorney, Agent, or Firm*—Lee & Hayes PLLC

(57) ABSTRACT

An apparatus for receiving and retaining an independently powered light includes an elongated molded body having a first aperture extending through the length of the elongated molded body. The first aperture is further adapted to receive and retain the independently powered light. The elongated molded body also has a second aperture extending through the length of the elongated molded body. The second aperture is also adapted for attachment to a tool.

7 Claims, 6 Drawing Sheets

LIGHT RETAINER

BACKGROUND

The subject invention generally and in various embodiments relates to devices for receiving and retaining independently powered lights, and more particularly to light holders for use with a tool.

In many instances, an independently powered light, such as a flashlight, may be used to illuminate a darkened space. More specifically, the light may be used to work provide a user with sufficient visibility to allow the user to perform a required function or operation. In cases where the user also must employ a tool in the course of performing the particular function or operation, the user may experience difficulty in positioning the light to illuminate an area in which the specific operation or function is to be performed with the tool.

In some operations a user may experience further problems where a strong light source emanates from behind the darkened space or where visibility is otherwise low, such that the user may become dazzled. In such cases, the overpowering light source may direct light toward the user's eyes from behind the work space of interest and inhibit the user's ability to freely position the portable independently powered light effectively into the darkened space to perform the operation or function.

SUMMARY

Various embodiments of the present invention include an apparatus for receiving and retaining an independently powered light. In some embodiments, the apparatus has an elongated molded body having a first aperture extending through the length of the elongated molded body. The first aperture is adapted to receive and retain the independently powered light. The elongated molded body also has a second aperture extending through the length of the elongated molded body. The second aperture is adapted for attachment to a tool.

In various embodiments, an apparatus for receiving and retaining an independently powered light includes a removable elongated molded body having an upper portion and a lower portion. The upper portion has a first aperture through the upper portion. The upper portion is configured to receive and retain the independently powered light. The elongated molded body also has a second aperture through the lower portion. The apparatus includes a tool configured to receive the elongated molded body about the second aperture.

In various embodiments, an apparatus for receiving and retaining an independently powered light includes an elongated molded body having a first retaining means for retaining the independently powered light within at least a portion of the first retaining means. The apparatus further includes an attachment means for removably mounting the retaining means to a tool.

Other systems, methods, and/or products according to embodiments will be or become apparent to one with skill in the art upon review of the following drawings and detailed description. It is intended that all such additional systems, methods, and/or products be included within this description, be within the scope of the present invention, and be protected by the accompanying claims.

BRIEF DESCRIPTION OF THE DRAWINGS

In the accompanying Figures, there are shown various embodiments of the present invention wherein like reference numerals are employed to designate like parts and wherein.

DETAILED DESCRIPTION

Figure 3:
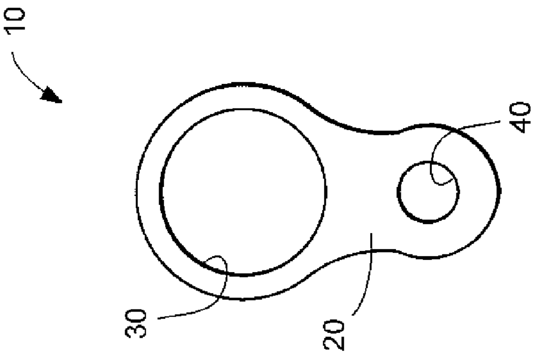
FIG. 3 is a front view of the light retainer of FIG. 1.
Figure 1:
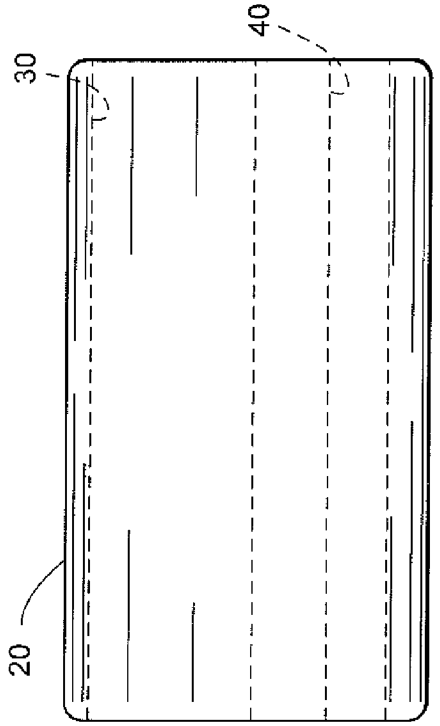
FIG. 1 is a side view of a light retainer according to various embodiments of the invention.
Figure 2:
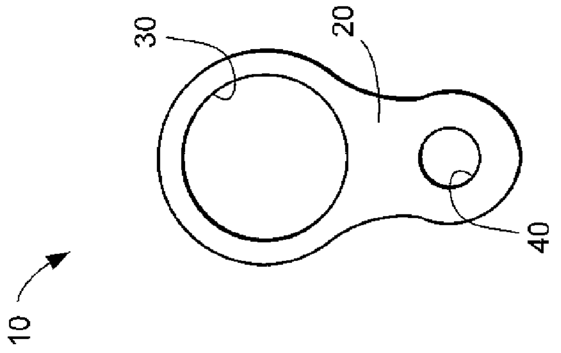
FIG. 2 is a rear view of the light retainer of FIG. 1.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity. In addition, it will be appreciated that the characterizations of various components and orientations described herein as being "vertical" or "horizontal", "right" or "left", "side", "top", "bottom", "upper" or "lower" are relative characterizations only based upon the particular position or orientation of a given component for a particular application.

FIGS. 1–5 depict various embodiments of a light retainer 10 that includes an elongated molded body 20 having a first aperture 30 and a second aperture 40. The first and second apertures 30, 40 extend through the elongated molded body 20 as shown by broken lines in FIG. 1.

The elongated molded body 20 may be constructed from a number of materials including, but not limited to, polymeric materials, rubber, etc. The elongated nature of the elongated molded body 20 allows the first aperture 30 to be of sufficient length to allow the elongated molded body 20 to retain an independently powered light 800. Additionally, the length of the elongated molded body 20 provides the second aperture 30 with a sufficient length to allow attachment to a tool 700. Further, the elongated molded body 20 may take on various shapes depending on the particular application. As illustrated, the elongated molded body 20 is shaped such that it follows the contour of the first and second apertures 30, 40, although other shapes may be implemented.

Figure 4:
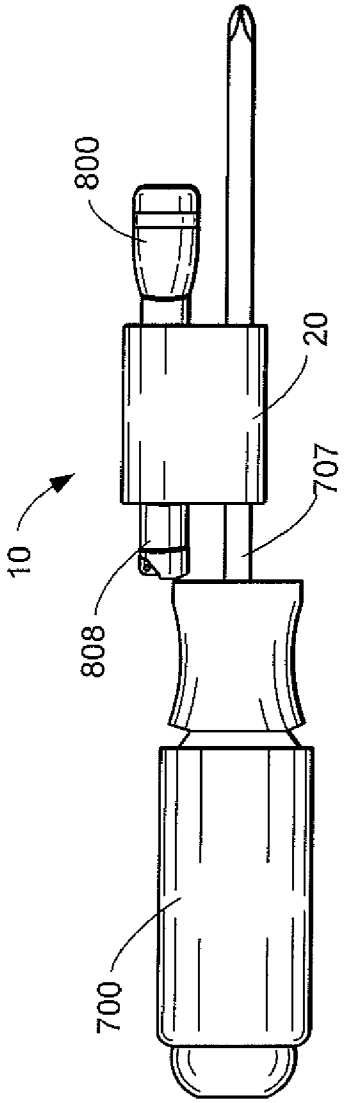
FIG. 4 is a side view of the light retainer of FIG. 1 with an independently powered light and a tool.
Figure 8:
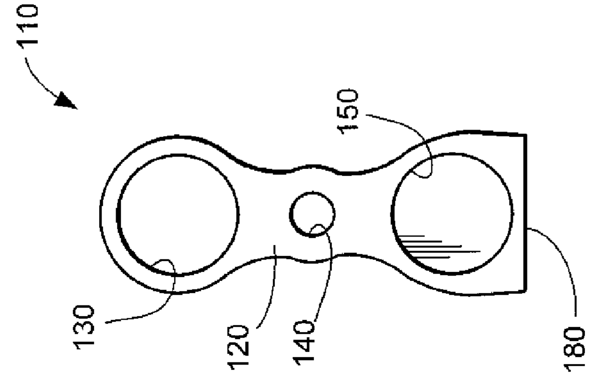
FIG. 8 is a rear view of the light retainer of FIG. 6.

In various embodiments, the first aperture 30 is configured to receive and retain the independently powered light 800, such as, for example, a flashlight 808. As shown in FIG. 4, the light 800 is received and retained within the first aperture 30. The light 800 may be received and retained in several different manners, including, but not limited to a friction fit. The first aperture 30 alternatively may be configured to hold the light 800 in various orientations and angles by creating the first aperture 30 along various angles and orientations as desired.

The second aperture 40 is adapted to attach to the tool 700. The second aperture 40 may be received by the tool 700 and may attach to the tool 700 in a variety of different manners, as will be discussed in detail below, including, but not limited to a friction fit. Further, the second aperture 40 may be configured to allow various mounting orientations as may be required for a particular application or tool 700, such as, for example, a screwdriver 707. As shown, when the screwdriver 707 is employed with the light retainer 10 having the light 800 therein, the orientation of the second aperture 40 allows the light 800 to provide a beam of light and additional illumination at or near the work area in which the tool 700 may contact another object.

Figure 5:
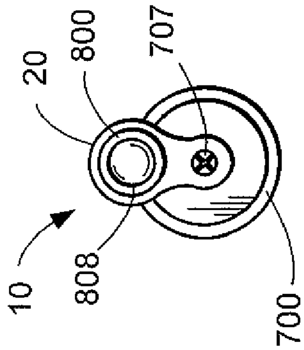
FIG. 5 is a front view of FIG. 4.

As shown in FIGS. 4–5, the elongated molded body 20 surrounds the light 800 such that the elongated molded body 20 receives and contacts the light 800 sufficiently to retain the light 800 in a desired position. The first aperture 30 of the elongated molded body 20 is constructed to contact the light 800 in a retaining fashion. Thus, the elongated molded body 20 contacts the light 800 by a friction fit, for example, although other methods of attaching the light retainer 10 to the tool 700 may be utilized.

Figure 6:
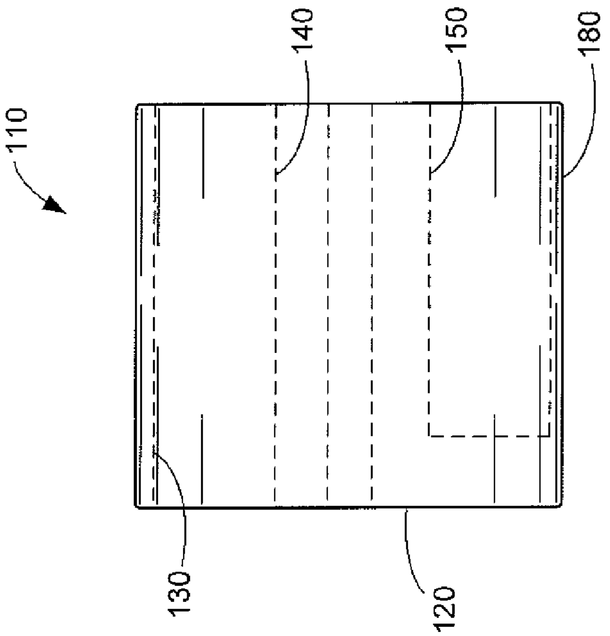
FIG. 6 is a side view of a light retainer according to various embodiments of the invention.
Figure 7:
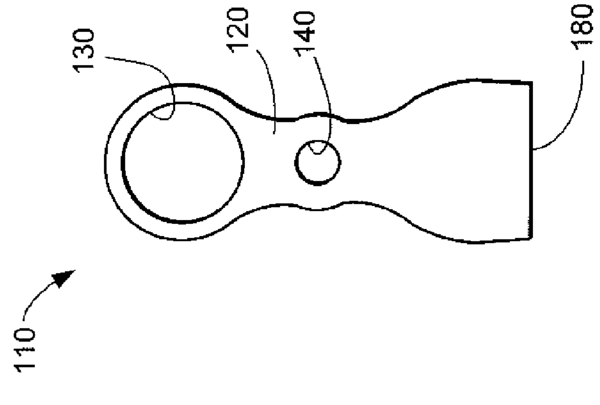
FIG. 7 is a front view of the light retainer of FIG. 6.

FIGS. 7–10 depict various embodiments of a light retainer 110 that has an elongated molded body 120. The elongated molded body 120 includes a first aperture 130 and a second aperture 140 through the elongated molded body 120 as shown by broken lines in FIG. 6. In addition, the elongated molded body 120 includes a third aperture 150 through at least a portion of the elongated molded body 120 to hold a spare power source 900. In some embodiments, the third aperture 150 may be positioned completely through the elongated molded body 120. The power source 900 may include various standardized forms such as, for example a battery 909.

The additional structure for the third aperture 150 tends to counter balance the first aperture 130, which is positioned on the opposite side of the second aperture 140. The light retainer 110 thus provides an increased moment of inertia about the central axis of the tool 700.

The elongated molded body 120 may be constructed from a number of materials including, but not limited to, polymeric materials, rubber, etc. The elongated nature of the elongated molded body 120 allows the first aperture 130 to be of sufficient length to make a stable connection with and retain an independently powered light 800. Additionally, the length of the elongated molded body 120 provides the second aperture 130 with a sufficient length to allow attachment to the tool 700. The third aperture 150 also provides a sufficient length to receive and retain the battery 909. The elongated molded body 120 may take on various shapes as determined by a given application. As illustrated, the elongated molded body 120 is shaped such that it generally follows the contour of the first and third apertures 130, 150 save a lower planar portion 180, although other shapes may be implemented.

As can be seen in FIGS. 7–10 the elongated molded body 120 has the lower planar portion 180. The lower planar portion 180 is configured to stabilize the elongated molded body 120 in an upright position when resting on the planar portion 180. This particular configuration may allow the user of the light retainer 110 to set the tool 700 down and perform another function while retaining the emitted light in a desired location.

Figure 9:
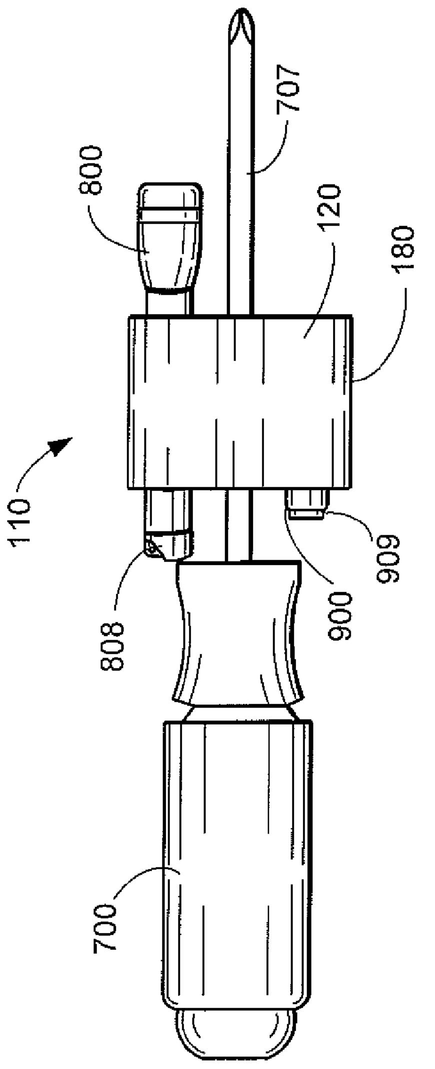
FIG. 9 is a side view of the light retainer of FIG. 6 with an independently powered light, a spare power source and a tool.

The first aperture 130 is configured to receive and retain the independently powered light 800, such as, for example, a flashlight 808. As shown in FIG. 9, the light 800 is received and retained within the first aperture 130. The light 800 may be received and retained in several different manners, including, but not limited to a friction fit. The first aperture 130 alternatively may be configured to hold the light 800 in various orientations and angles by creating the first aperture 130 along various angles and orientations, as desired.

The second aperture 140 is adapted to attach to the tool 700. The second aperture 140 may receive the tool 700 and may further attach to the tool 700 in a variety of different manners, as will be discussed in further detail below, including, but not limited to, a friction fit. The second aperture 140 alternatively may be configured so as to allow for various mounting orientations as may be required for a particular application or tool 700. As shown, the orientation of the second aperture 140 is such that when the screwdriver 707 is employed with the light retainer 110 having a light 800 therein, the beam of light may provide additional illumination at or near the work area in which the tool 700 may be required to contact another object.

The elongated molded body 120 also has the third aperture 150, as illustrated in FIGS. 7–10. The third aperture 150 is provided for receiving and retaining any additional spare power sources 900. Although the particular embodiment illustrated depicts the third aperture 150 as round, other sizes and shapes may be required for various power sources 900. In some embodiments, the third aperture 150 may extend through the entire length of the elongated molded body 120 or merely a portion of the way as illustrated by broken lines in FIG. 6.

Figure 10:
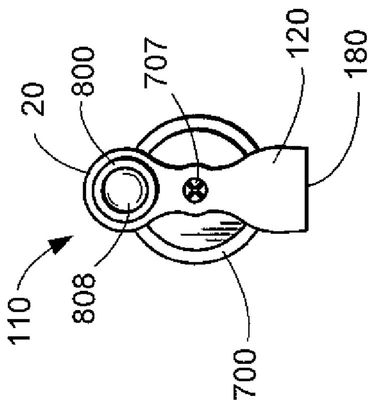
FIG. 10 is a front view of FIG. 9.

As shown in FIGS. 9–10, the elongated molded body 120 surrounds the light 800 such that the elongated molded body 120 receives and contacts the light 800 sufficiently to retain the light 800 in a desired position. The first aperture 130 of the elongated molded body 120 is constructed to contact the light 800 in a retaining fashion. The elongated molded body 120 contacts the light 800 by, for example, a friction fit, although other methods of attachment are possible.

Figure 11:
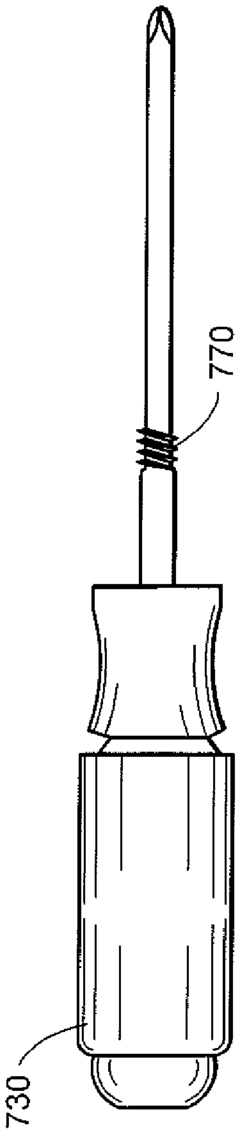
FIG. 11 is a side view of a tool with a light retainer according to various embodiments of the invention.
Figure 12:
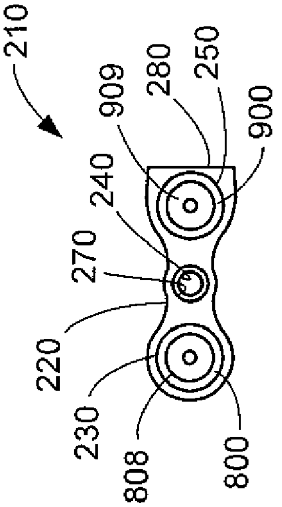
FIG. 12 is a front view of a light retainer according to various embodiments of the invention.

FIGS. 11 and 12 depict a light retainer 210 having an elongated molded body 220 that can be mounted to a tool 730 by threads 270, which are positioned within a second aperture 240. Generally, a user may removably attach the light retainer 210 by positioning the threads 270 about corresponding threads 770 on the tool 730. An independently powered light 800 then may be retained within a first aperture 230 in a desired position by positioning the light retainer 210 on the tool 730.

In addition, the elongated molded body 220 includes a third aperture 250, as illustrated, through at least a portion of the elongated molded body 220 to hold a spare power source 900. The power source 900 may include various standardized forms such as, for example, a battery 909.

The additional structure for the third aperture 250 tends to counter balance the first aperture 230, which is positioned on the opposite side of the second aperture 240. The light retainer 210 thus provides an increased moment of inertia about the central axis of the tool 730.

The elongated nature of the elongated molded body 220 allows the first aperture 230 a sufficient length in which to make a stable connection with and retain the light 800. The length of elongated molded body 220 also provides the second aperture 230 with a sufficient length to allow attachment to the tool 730. The third aperture 250 has a sufficient length to receive and retain the battery 909. The elongated molded body 220 also may be constructed from a number of materials including, but not limited to, polymeric materials, rubber, etc. Further, the elongated molded body 220 may take on various shapes as determined by a particular application. As illustrated, the elongated molded body 220 is shaped such that it generally follows the contour of the first and third apertures 230, 250, save a lower planar portion 280.

As can be seen in FIGS. 11–12 the elongated molded body 220 has the lower planar portion 280. The lower planar portion 280 is configured to stabilize the elongated molded body 220 in an upright position when resting on the planar portion 280. This particular configuration may allow the user of the light retainer 210 to set the tool 730 down and perform another function while retaining the emitted light in a desired location.

The first aperture 230 is configured to receive and retain the light 800. The light 800 may be a flashlight 808, as illustrated, or otherwise may be another light source. As shown in FIG. 12, the light 800 is received and retained within the first aperture 230. The light 800 may be received and retained in several different manners, including, but not limited to a friction fit. The first aperture 230 alternatively may be configured to hold the light 800 in various orientations by creating the first aperture 230 along various angles and orientations as desired.

As shown in FIGS. 11 and 12, the second aperture 240 is adapted to attach to the tool 730. The second aperture 240 receives the tool 730 and may releasably attach to the tool 730 by mating the threads 270 with the complimentary threads 770. The second aperture 240 alternatively may be configured to allow for various mounting orientations. As shown, the orientation of the second aperture 240 is such that when the tool 730 is attached with the light retainer 210 having the light 800 therein, the beam of light may provide additional illumination at or near the work area in which the tool 730 may be required to contact another object.

Various embodiments also include the elongated molded body 220 having the third aperture 250, as illustrated in FIG. 12. The third aperture 250 is provided for receiving and retaining any additional spare power sources 900. Although the particular embodiment illustrated depicts the third aperture 250 as round, other sizes and shapes may be required for various power sources 900. The third aperture 250 also may extend through the entire length of the elongated molded body 220 or merely a portion of the way.

Figure 13:
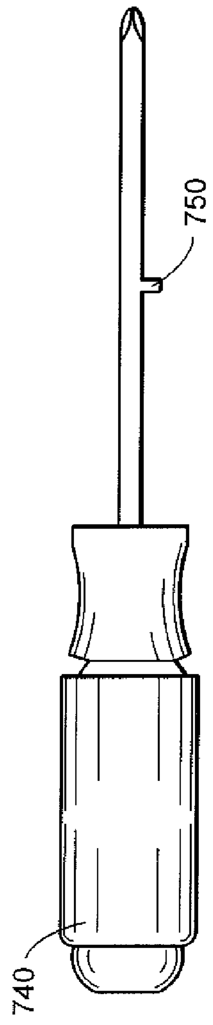
FIG. 13 is a side view of a tool for use in combination with a light retainer according to various embodiments of the invention.
Figure 15:
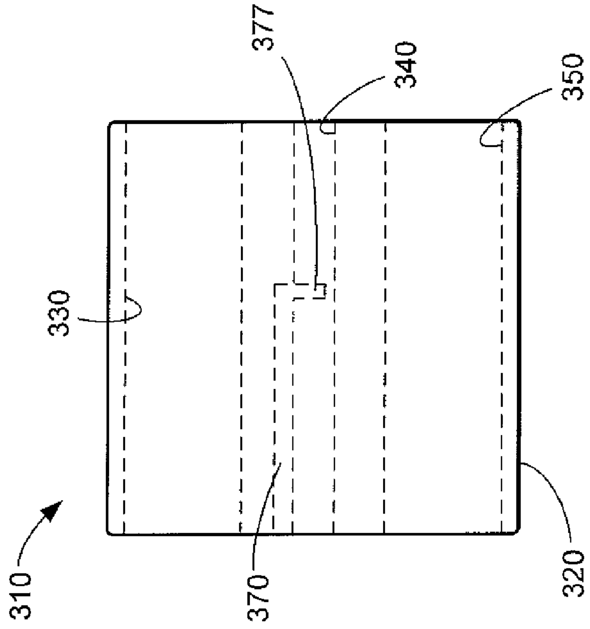
FIG. 15 is a side view of the light retainer of FIG. 14.
Figure 14:
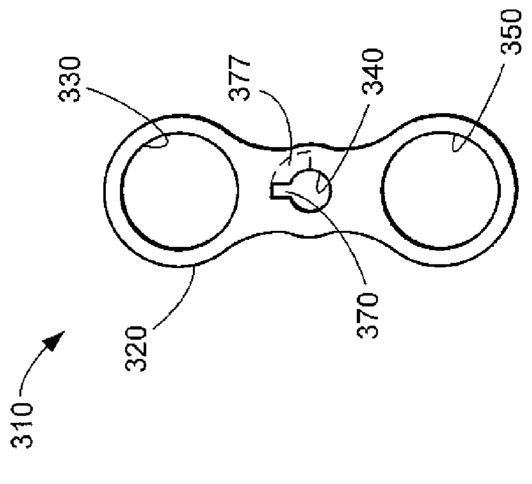
FIG. 14 is a front view of a light retainer according to various embodiments of the invention.

A light retainer 310 is shown in FIGS. 13–15 having an elongated molded body 320 that has a first aperture 330, a second aperture 340 and a third aperture 350. The first, second and third apertures 330, 340, 350 extend through at least a portion of the elongated molded body 320 as shown by broken lines in FIG. 15. The first aperture 330 is provided to hold a light (not shown) while the third aperture 350 is configured to hold a spare power source (not shown).

The elongated configuration of the elongated molded body 320 allows the first aperture 330 to be of sufficient length to make a stable connection with and retain the light such as, for example, a flashlight. Additionally, the length of elongated molded body 320 provides the second aperture 330 with a sufficient length to allow attachment to a tool 740. The third aperture 350 provides a sufficient length to receive and retain the spare power source, which may be, for example, a battery (not shown). The elongated molded body 320 may be constructed from a number of materials including, but not limited to, polymeric materials, rubber, etc. The elongated molded body 320 may take on various shapes as determined by a particular application. The elongated molded body 320 is shaped such that it generally follows the contour of the first and third apertures 330, 350.

As depicted in the drawings, the first aperture 330 is configured to receive and retain a light (not shown). The light may be a flashlight or otherwise may be another light source and may be received and retained in several different manners, including, but not limited to a friction fit. The first aperture 330 alternatively may be configured to hold the light in various angles and orientations by creating the first aperture 330 along various angles and orientations as desired.

The second aperture 340 is adapted to attach to the tool 740 by way of a notch 750 on the tool 740. The tool 740 receives the molded body 320 within the second aperture 340. When the second aperture 340 reaches the notch 750, the notch 750 should be aligned with a slot 370 in the second aperture 340. As the molded body 320 is slid over the notch 750 within the slot 370, the molded body will eventually contact the end of the slot 370 and enter the locking slot 377. The molded body 320 is then rotated about the notch 750 so that the notch 750 leaves the slot 370 and enters the locking slot 377. Thus, the molded body 320 may releasably attach to the tool 740 by mating the notch 750 with the locking slot 377.

The second aperture 340 alternatively may be configured to allow for various mounting orientations. As shown, the orientation of the second aperture 340 is such that when the tool 740 is attached with the light retainer 310 having a light therein, the beam of light may provide additional illumination at or near the work area in which the tool 740 may be required to contact another object.

The elongated molded body 320 has the third aperture 350, as illustrated in FIGS. 14–15 and shown by broken lines in FIG. 15. The third aperture 350 is provided for receiving and retaining any additional power sources. Although the particular embodiment illustrated depicts the third aperture 350 as round, other sizes and shapes may be required for various power sources. The third aperture 350 also may extend through the entire length of the elongated molded body 320 as shown by broken lines in FIG. 15.

The additional structure for the third aperture 350 tends to counter balance the first aperture 330, which is positioned on the opposite side of the second aperture 340. The light retainer 310 thus provides an increased moment of inertia about the central axis of the tool 740.

Whereas particular embodiments of the invention have been described herein for the purpose of illustrating the invention and not for the purpose of limiting the same, it will be appreciated by those of ordinary skill in the art that numerous variations of the details, materials, configurations and arrangement of parts may be made within the principle and scope of the invention without departing from the spirit of the invention. One such example may be the addition of a centrally located pocket to hold a spare capsule shaped bulb for the light. Other examples may include additional areas in which to store additional spare power sources, etc. The preceding description, therefore, is not meant to limit the scope of the invention.

What is claimed is:

1. An apparatus for receiving and retaining an independently powered light, the apparatus comprising:

an elongated molded body having a first aperture extending through the length of the elongated molded body wherein the first aperture is adapted to receive and retain the independently powered light therein and a second aperture extending through the length of the elongated molded body wherein the second aperture is adapted for attachment to a tool, and the elongated molded body has a third aperture extending through at least a portion of the length of the elongated molded body.

2. The apparatus of claim 1, wherein the third aperture is configured to receive and retain a power source for the independently powered light.

3. The apparatus of claim 2, wherein the power source comprises a battery.

4. An apparatus for receiving and retaining an independently powered light, the apparatus comprising:

an elongated molded body having a first aperture extending through the length of the elongated molded body and a second aperture extending through the length of the elongated molded body;

wherein the first aperture is adapted to receive and retain the independently powered light therein and the second aperture is adapted for attachment to a tool; and wherein the second aperture has threads therein adapted to mate with the tool, and the tool has complimentary threads.

5. An apparatus for receiving and retaining an independently powered light, the apparatus comprising:

a removable elongated molded body having an upperportion with a first aperture therethrough and a lower portion, wherein the upper portion is configured to receive and retain the independently powered light, and wherein the elongated molded body has a second aperture through the lower portion; and a tool configured to receive the elongated molded body about the second aperture;

wherein the elongated molded body comprises a third aperture extending through at least a portion of the lower portion below the second aperture and adapted to receive and retain a power source for the independently powered light.

6. The apparatus of claim 5, wherein the power source comprises a battery.

7. An apparatus for receiving and retaining an independently powered light, the apparatus comprising:

a removable elongated molded body having an upper portion with a first aperture therethrough and a lower portion, wherein the upper portion is configured to receive and retain the independently cowered light, and wherein the elongated molded body has a second aperture through the lower portion; and a tool configured to receive the elongated molded body about the second aperture;

wherein the second aperture has threads therein adapted to mate with the tool, wherein the tool has complimentary threads.

* * * * *